United States Patent
Kim

(10) Patent No.: US 11,128,454 B2
(45) Date of Patent: Sep. 21, 2021

(54) QUANTUM SAFE CRYPTOGRAPHY AND ADVANCED ENCRYPTION AND KEY EXCHANGE (AEKE) METHOD FOR SYMMETRIC KEY ENCRYPTION/EXCHANGE

(71) Applicant: Bong Mann Kim, Corona, CA (US)

(72) Inventor: Bong Mann Kim, Corona, CA (US)

( * ) Notice: Subject to any disclaimer, the term of this patent is extended or adjusted under 35 U.S.C. 154(b) by 3 days.

(21) Appl. No.: 16/849,250

(22) Filed: Apr. 15, 2020

(65) Prior Publication Data

US 2021/0218561 A1 Jul. 15, 2021

Related U.S. Application Data

(60) Provisional application No. 62/854,651, filed on May 30, 2019.

(51) Int. Cl.
*H04L 9/08* (2006.01)
*H04L 29/06* (2006.01)

(52) U.S. Cl.
CPC ........ *H04L 9/0852* (2013.01); *H04L 63/0435* (2013.01)

(58) Field of Classification Search
CPC ..... H04L 9/00; H04L 9/08; H04L 9/30; H04L 9/0852; H04L 63/0435; H04L 9/28; H04L 29/06; G06Q 20/00; H04K 1/00
See application file for complete search history.

(56) References Cited

U.S. PATENT DOCUMENTS

| | | | |
|---|---|---|---|
| 5,978,918 A * | 11/1999 | Scholnick | G06F 21/6263 705/53 |
| 6,005,943 A | 12/1999 | Cohen et al. | |
| 6,311,171 B1 | 10/2001 | Dent | |
| 6,377,689 B1 * | 4/2002 | Vanstone | H04L 9/302 380/259 |
| 6,697,946 B1 | 2/2004 | Miyaji | |
| 6,859,533 B1 | 2/2005 | Wang et al. | |
| 7,006,633 B1 | 2/2006 | Reece | |
| 7,103,911 B2 | 9/2006 | Spies et al. | |
| 7,499,544 B2 | 3/2009 | Jao et al. | |
| 7,590,854 B2 | 9/2009 | Gentry et al. | |
| 7,657,748 B2 * | 2/2010 | Gentry | H04L 9/3073 713/170 |
| 7,660,987 B2 | 2/2010 | Baylis et al. | |
| 7,688,973 B2 | 3/2010 | Akiyama et al. | |
| 7,716,482 B2 | 5/2010 | Jung et al. | |
| 7,765,582 B2 | 7/2010 | Spies et al. | |
| 7,773,747 B2 | 8/2010 | Akiyama et al. | |
| 7,929,700 B2 | 4/2011 | Lodewyck et al. | |
| 8,086,857 B2 | 12/2011 | Appenzeller et al. | |
| 8,108,678 B1 | 1/2012 | Boyen | |
| 8,223,970 B2 | 7/2012 | Sannino et al. | |
| 8,270,613 B2 | 9/2012 | Furukawa et al. | |

(Continued)

*Primary Examiner* — Thanhnga B Truong
(74) *Attorney, Agent, or Firm* — Kirk A. Buhler; Buhler & Associates Patenting

(57) ABSTRACT

An advanced encryption and key exchange (AEKE) algorithm for quantum safe cryptography is disclosed. The AEKE algorithm does not use hard mathematical problems that are easily solvable on a quantum computer with Shor's algorithm. Instead, new encryption algorithm uses simple linear algebra, rank deficient matrix and bilinear equation, which will be easy to understand, fast, efficient and practical but virtually impossible to crack.

15 Claims, 2 Drawing Sheets

(56) References Cited

U.S. PATENT DOCUMENTS

| | | | |
|---|---|---|---|
| 8,320,559 B1 | 11/2012 | Boneh et al. | |
| 8,340,284 B2 | 12/2012 | Furukawa | |
| 8,353,023 B2 | 1/2013 | Spies et al. | |
| 8,447,036 B2 | 5/2013 | Jho et al. | |
| 8,464,059 B2* | 6/2013 | Richardson | H04L 63/0442 |
| | | | 713/171 |
| 8,694,771 B2 | 4/2014 | Malek | |
| 8,769,259 B2 | 7/2014 | Broustis et al. | |
| 8,874,915 B1 | 10/2014 | Rodoper et al. | |
| 9,049,024 B2 | 6/2015 | Sundaram et al. | |
| 9,147,079 B2 | 9/2015 | Furukawa | |
| 9,246,674 B2* | 1/2016 | Brainis | H04L 9/0861 |
| 9,246,675 B2 | 1/2016 | Ding | |
| 9,246,683 B2 | 1/2016 | Hayashi et al. | |
| 9,356,779 B2 | 5/2016 | Boneh et al. | |
| 9,722,787 B2 | 8/2017 | Garcia Morchon et al. | |
| 9,800,555 B2 | 10/2017 | Ignatenko et al. | |
| 9,894,151 B2 | 2/2018 | Dhuse et al. | |
| 9,923,720 B2 | 3/2018 | Garcia Morchon et al. | |
| 9,973,334 B2 | 5/2018 | Hibshoosh et al. | |
| 10,211,984 B2 | 2/2019 | Asim et al. | |
| 10,212,142 B2 | 2/2019 | Dearlove et al. | |
| 10,341,098 B2 | 7/2019 | Bos et al. | |
| 10,439,800 B2 | 10/2019 | Garcia-Morchon et al. | |
| 10,439,808 B2 | 10/2019 | Alleaume | |
| 10,454,681 B1 | 10/2019 | Yamada et al. | |
| 2003/0076959 A1* | 4/2003 | Chui | H04K 1/00 |
| | | | 380/277 |
| 2004/0123110 A1 | 6/2004 | Zhang et al. | |
| 2007/0055867 A1* | 3/2007 | Kanungo | H04L 9/3265 |
| | | | 713/156 |
| 2008/0063193 A1 | 3/2008 | Nishioka | |
| 2010/0329447 A1 | 12/2010 | Akiyama et al. | |
| 2013/0114810 A1 | 5/2013 | Kobayashi et al. | |
| 2015/0100785 A1 | 4/2015 | Joye et al. | |
| 2016/0301526 A1 | 10/2016 | Rietman et al. | |
| 2017/0207914 A1 | 7/2017 | Sakemi et al. | |
| 2017/0208062 A1 | 7/2017 | Morikawa et al. | |
| 2017/0346627 A1 | 11/2017 | Alleaume | |
| 2020/0026867 A1 | 1/2020 | Nicholls | |

* cited by examiner

QUANTUM SAFE CRYPTOGRAPHY AND ADVANCED ENCRYPTION AND KEY EXCHANGE (AEKE) METHOD FOR SYMMETRIC KEY ENCRYPTION/EXCHANGE

CROSS REFERENCE TO RELATED APPLICATION

This application claims the benefit of Provisional Application Ser. No. 62/854,651 filed May 30, 2019 and International PCT application PCT/US20/28228 filed Apr. 15, 2020, the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in data encryption. More particularly, the present quantum safe cryptography and advanced encryption and key exchange method for symmetric key encryption/exchange creates a secure data exchange uses simple linear algebra, rank deficient matrix and a bilinear equation, which will be easy to understand, fast, efficient and practical but almost impossible to crack.

Description of Related Art Including Information Disclosed Under 37 CFR 1.97 and 1.98

Encryption is widely used in our daily lives even without the user being aware of it. Public key encryption is a great system but is relatively slow; therefore, it is typically used to encrypt the symmetric keys to disseminate them securely. However, it can be easily cracked on a sufficiently powerful quantum computer running Shor's algorithm. Although quantum computers are not ready for common use yet, they are just around the corner. When that happens, current encryption system will be collapsed to chaos in our daily lives.

A number of patents and or publications have been made to address these issues. Exemplary examples of patents and or publication that try to address this/these problem(s) are identified and discussed below.

U.S. Pat. No. 9,722,787 issued on Aug. 1, 2017 to Garcia Morchon and is titled Key sharing device and system for configuration thereof. This patent discloses a method of configuring a network device for key sharing and a method for a first network device to determine a shared key are provided. The method of configuring uses a private modulus ($p.sub.1$) a public modulus (N), and a bivariate polynomial ($f.sub.1$) having integer coefficients, the binary representation of the public modulus and the binary representation of the private modulus are the same in at least key length (b) consecutive bits. While this patent discloses a key sharing system it does not use a rank deficient matrix.

U.S. Pat. No. 8,447,036 issued on May 21, 2013 to Namsu Jho and is titled Multi-Party Key Agreement Method Using Bilinear Map and System Therefor. This patent discloses an efficient method and system in which a plurality of participants share a secret key in a communication environment that is not ensured. According to an embodiment of the invention, each of the participants is assigned with a secret key from a key generation party, generates exchange information, and transmits its own exchange information to the other participant to exchange the exchange information with each other. Each of the participants generates a shared key on the basis of the exchange information and its own secret key. While this patent uses keys and bilinear maps, uses a secret key assigned from a key generation party as opposed to user generated secret keys and rank deficient matrix.

U.S. Pat. No. 10,454,681 issued on Oct. 22, 2019 to Atsushi Yamada and is titled Multi-use Key Encapsulation Process. This patent discloses a random seed value may be used in a key encapsulation process for multiple recipients. An error vector derivation function is applied to a combination of the random seed value and an additional value, including an identifier of a recipient, to produce an error vector. A plaintext value for the recipient is obtained based on the random seed value. The error vector and the plaintext value are used in an encryption function to produce a ciphertext for the recipient. A pseudorandom function is applied to the random seed value to produce a pseudorandom function output that includes a symmetric key, and the symmetric key is used to generate an encrypted message for the recipient based on an unencrypted message. While this patent discloses a key encapsulation process, it does not use a bilinear equation.

What is needed is a way to improve on public key encryption schemes in use today to provide secure encryption that is virtually impossible to crack even on quantum computers. The quantum safe cryptography and advanced encryption and key exchange method for symmetric key encryption/exchange disclosed in this document provides the solution.

BRIEF SUMMARY OF THE INVENTION

It is an object of the quantum safe cryptography and advanced encryption and key exchange method for symmetric key encryption/exchange to include a novel quantum safe cryptography and advanced encryption and key exchange (AEKE) method for symmetric key encryption/exchange.

It is an object of the quantum safe cryptography and advanced encryption and key exchange method for symmetric key encryption/exchange to use quantum safe cryptography and AEKE method does not use easily solvable hard mathematical problems on a quantum computer with Shor's algorithm.

It is another object of the quantum safe cryptography and advanced encryption and key exchange method for symmetric key encryption/exchange to use quantum safe cryptography and AEKE method uses simple linear algebra and a bilinear equation, which will be easy to understand, fast, efficient and practical but almost impossible to crack.

It is another object of the quantum safe cryptography and advanced encryption and key exchange method to use a novel rank deficient matrix for key exchange method.

It is another object of the quantum safe cryptography and advanced encryption and key exchange method for symmetric key encryption/exchange to establish a new novel encryption algorithm using linear algebra and bilinear equation framework. The underlying idea of using a bilinear equation is that it is almost impossible to find two unknown variables from one known value. This algorithm will resist the quantum computer attacks and make new encryption system safe.

It is still another object of the quantum safe cryptography and advanced encryption and key exchange method for symmetric key encryption/exchange for the private key exchange to rely on hard mathematical problems, which can be easily solved on quantum computers. In contrast, the quantum safe cryptography and AEKE method will use rank deficient matrix and bilinear equation framework but is almost impossible to solve.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
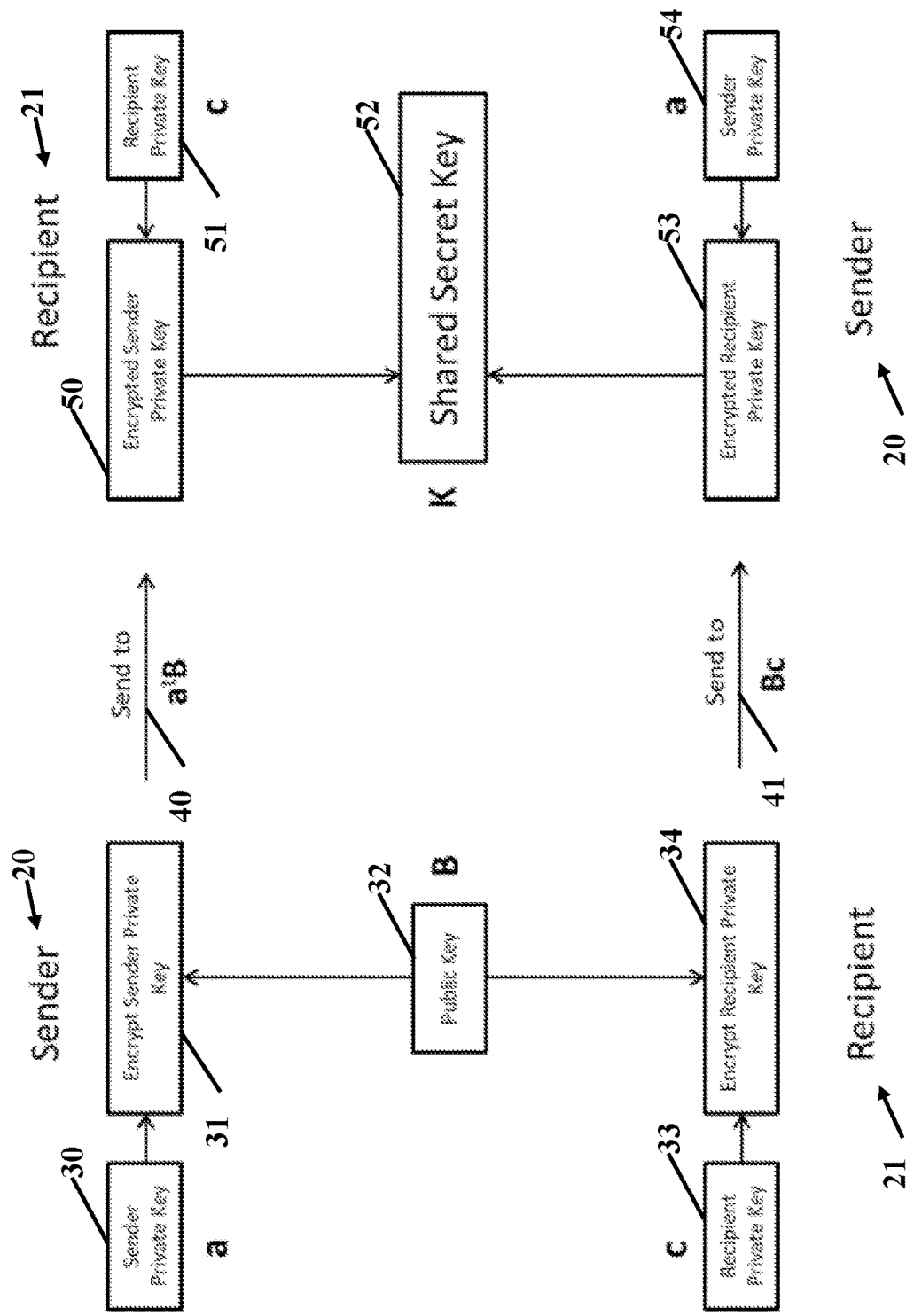
FIG. 1 shows a shared symmetric key generation and exchange method.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

| Item Numbers and Description | |
| --- | --- |
| 20 sender | 21 recipient |
| 30 sender private key | 31 encrypted sender private key |
| 32 public key | 33 recipient private key |
| 34 encrypted recipient private key | 40 send to $a^t B$ |
| 41 Send to Bc | 50 encrypted sender private key |
| 51 recipient private key | 52 shared secret key |
| 53 encrypted recipient private key | 54 sender private key |
| 61 message | 62 encryption |
| 63 decryption | 64 message |
| 65 send to | |

The quantum safe cryptography and AEKE method for symmetric key encryption/exchange of the present disclosure may be comprised of the following elements. This list of possible constituent elements is intended to be exemplary only and it is not intended that this list be used to limit the quantum safe cryptography and AEKE method of the present application to just these elements.

FIG. 1 shows a shared symmetric key generation and exchange method.

Shared Private Key Exchange

1. Shared key generation and distribution uses an equation of $k=a^t Bc$, where k is 1×1 vector of shared private key for sender and recipient, $a^t$ is a transpose of n×1 vector a of sender private key, B is n×n matrix of public key, and c is n×1 vector of recipient private key.

2. From FIG. 1, both sender and recipient of the message generate their own private keys, as a sender private key 30 a and a recipient private key 33 c. The sender private key 30 a and the recipient private key 33 c are created with secure random number generator(s) or any other method that is unpredictable.

3. The sender generates a public key 32 B with secure random number generator or any other method that is unpredictable and makes the public key 32 B rank deficient matrix (by making the public key 32 B linearly dependent.)

4. The sender transmits the public key B to the recipient.

5. Both the sender and recipient encrypt the sender private key 30 a and the recipient private key 33 c with the same public key 32 B (31 $e_s^t=a^t B$ for sender and 34 $e_r=Bc$ for recipient).

6. The sender 20 sends encrypted sender private key 31 $e_s^t$ to the recipient 21 (40) and the recipient 21 sends encrypted recipient private key 34 $e_r$ to the sender 20 (41).

7. Sender generates the shared private key 52 k with encrypted recipient private key 53 $e_r$ and sender private key 54 a by $a^t e_r$ and converts it into p×n matrix K by splitting the key into each cell of matrix K.

8. Recipient generates the same-shared private key 52 k with encrypted sender private key 50 $e_s^t$ and recipient private key 51 c by $e_s^t c$ and converts it into p×n matrix K by splitting the key into each cell of matrix K.

9. If only one user encrypts and decrypts the information, the user generates the private key 52 K with a, B, c, and secure random number generator or any other method that is unpredictable.

The Above Steps 1-8 is how to Generate the Shared Key and Exchange the Shared Key Between Sender and Recipient—This is the Novel Key Exchange Feature.

Figure 2:
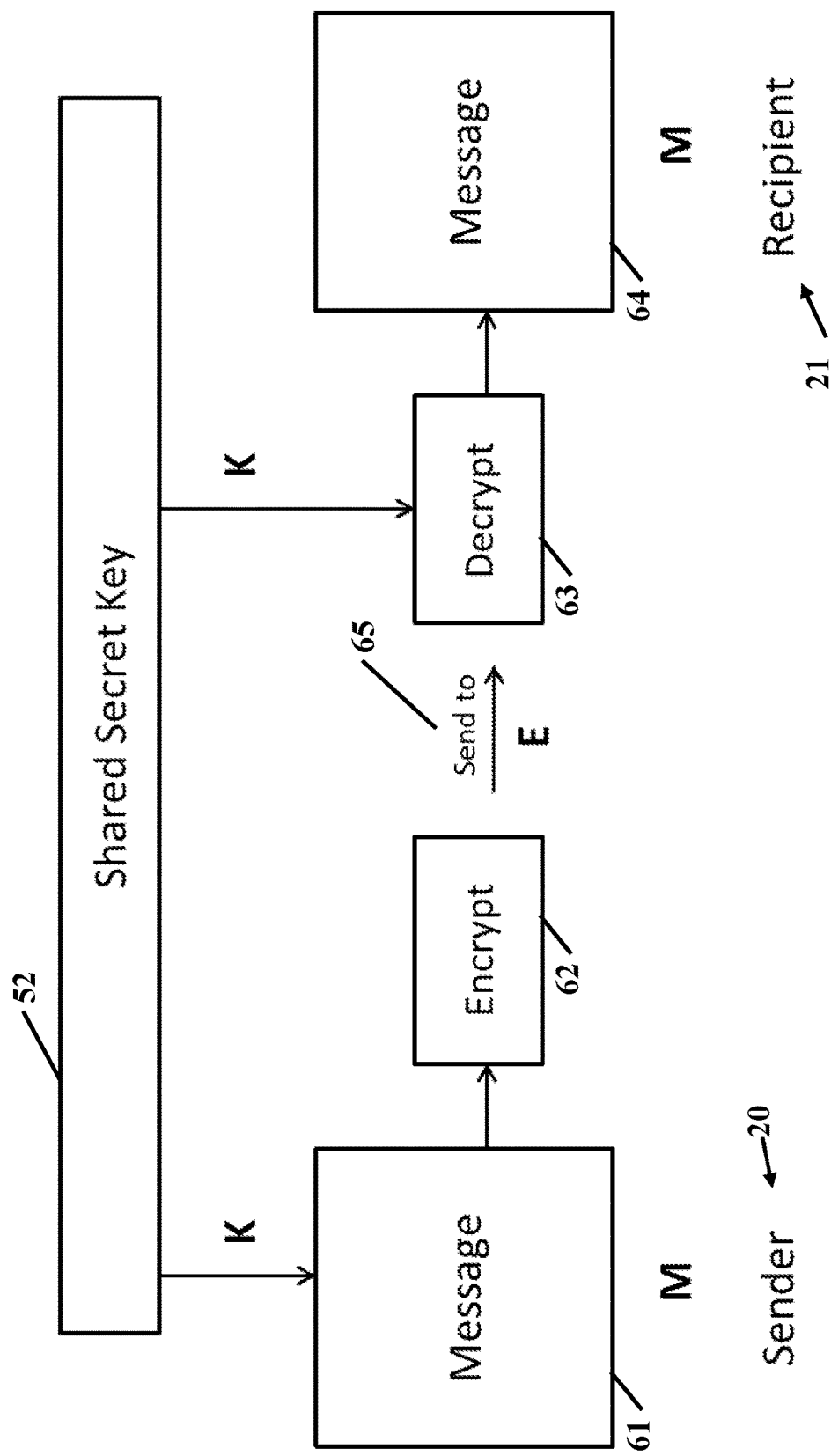
FIG. 2 shows an encryption and decryption method using a shared symmetric key.

FIG. 2 shows an encryption and decryption method using a shared symmetric key.

Encryption and Decryption of the Message

10. AEKE symmetric key encryption uses E=MK+D as the encryption algorithm, which is a bilinear equation, where E is m×n cipher text, M is m×p message, K is p×n private key, and D=m×n error matrix. (THIS IS THE ENCRYPTION FEATURE).

11. The sender converts the message into numbers and splits it into each cell of the message matrix 61 M using ASCII character code or equivalent table.

12. The sender generates m×n error matrix D with a secure random number generator or any other method that is unpredictable using the shared private key k as a seed.

13. The sender generates the cipher text E with message 61 M, error matrix D and shared secret key 52 K using E=MK+D. If more security is needed, the encryption can use different key for each cell of K.

14. The sender 20 can add characters to make uniform distribution of the cipher text E and shuffle it if more security is needed for the cipher text E.

15. The sender 20 sends the cipher text E to the recipient 21.

16. The recipient 21 unshuffle and subtract added characters from the cipher text E if adding characters and shuffling are used.

17. In the decryption, the recipient 21 generates m×n error matrix D with a secure random number generator or any other method that is unpredictable using the shared private key k as a seed and decrypts 63 the cipher text E to recover the numbers in the message 64 M using error matrix D and the shared private key 52 K from $M=(E-D)K^r(KK^r)^{-1}$.

18. The recipient converts the recovered number in message M into the readable message 64.

The various elements of the quantum safe cryptography and AEKE method for symmetric key encryption/exchange of the present disclosure may be related in the following exemplary fashion. It is not intended to limit the scope or nature of the relationships between the various elements and the following examples are presented as illustrative examples only. Steps 2 and 3 are the private and public key generation steps needed to generate the shared key in steps 7 and 8. In step 5, private keys for the sender and the recipient generated from step 2 are encrypted with a public key generated from step 3. Then the shared same private key for the sender and the recipient is generated in steps 7 and 8. If a single user uses AEKE system, shared key generation is not needed; therefore, the user would skip steps 4 through 8 and step 15. Instead, the single user could just generate a private key in step 9 with a, B and c. Message is encrypted into a cipher text in steps 11 through 14. Then the cipher text is decrypted and converted into the original message in steps 16 through 18.

The quantum safe cryptography and AEKE method of the present disclosure generally works by following the above-listed steps. In this way, a sending user (the sender) can encrypt a message to a cipher text using a shared private key. Then the recipient can decrypt the cipher text to a readable plain text using the same-shared private key. Shared symmetric key generation and its key exchange method can be applied to the secure one-time pad generation.

To make the quantum safe cryptography and AEKE method of the present disclosure, one may implement the steps of the method into a practical application, such as a program that implements the above-listed steps so that users can easily use the quantum safe cryptography and AEKE scheme to successfully provide secure messaging. Also, it is possible to make the quantum safe cryptography and AEKE method more secure by extending the length of both the sender and the recipient private keys in each cell of a vector, or just be using a matrix instead of a vector, or both extending the length of the keys and using a matrix. This will increase the complexity of the shared private key. The encryption can also use different key for each cell of K to increase the security. In addition, using real numbers instead of integers in all cells of a vector and a matrix will increase the security of the encryption system. To further increase the security of the encryption, characters can be added to the cipher text to make it uniform distribution and shuffle the cipher text using private key k as a seed as well.

To use the quantum safe cryptography and AEKE method of the present disclosure, a user would typically follow the steps listed above in the order shown. By following the above-listed steps, in the order listed, the secret key can be securely shared between the sender and the recipient. Then the recipient can securely decrypt the cipher text sent by the sender without using the public encryption of the secret key. However, the order of the steps for using the quantum safe cryptography and AEKE method is not a required order. In other embodiments of the quantum safe cryptography and AEKE method the order of the steps can vary from the order shown above. For instance, in some embodiments, step 3 can occur before step 2 and the quantum safe cryptography and AEKE method will provide identical results. In addition, steps 7 and 8 can be shuffled.

For a better understanding of the shared key exchange and symmetric key encryption method, this document provides an example using a message "Hello World!" illustrated in step-by-step for the case of m=n=p=3 and the message "Hello World!".

1. Shared Symmetric Key Generation

Step 1. Sender generates its own sender private key 30 with a secure random number generator or any other method that is unpredictable. In this example the sender private key is identified as $a^t$=[227 148 339] and linearly dependent rank deficient public key 32 B.

There are many ways to create a rank deficient matrix. In this illustration, public key B is made a rank one matrix, i.e. the second and third columns and rows are multiples of the first column and row, respectively.

$$B = \begin{bmatrix} 1 & 2 & 3 \\ 2 & 4 & 6 \\ 3 & 6 & 9 \end{bmatrix}$$

Then sender encrypts its own sender private key 30 a with the public key 32 B.

$$e_s^t = a^t B = \begin{bmatrix} 227 & 148 & 339 \end{bmatrix} \begin{bmatrix} 1 & 2 & 3 \\ 2 & 4 & 6 \\ 3 & 6 & 9 \end{bmatrix} = \begin{bmatrix} 1540 & 3080 & 4620 \end{bmatrix}$$

Step 2. The sender 20 transmits both encrypted private key $e_s$ and the public key 32 B to the recipient 21.

Step 3. The recipient generates its own recipient private key 33 c with a secure random number generator or any other method that is unpredictable. In this example the recipient private key is $c^t$=[389 268 428] and the recipient encrypts its own private key 34 with the public key 32 B.

$$e_r = Bc = \begin{bmatrix} 1 & 2 & 3 \\ 2 & 4 & 6 \\ 3 & 6 & 9 \end{bmatrix} \begin{bmatrix} 389 \\ 268 \\ 428 \end{bmatrix} = \begin{bmatrix} 2209 \\ 4418 \\ 6627 \end{bmatrix}$$

Then recipient 21 sends $e_r$ the sender 20.

Step 4. Sender generates the shared private key 52 k with the own sender private key 54 a and the encrypted recipient private key 53 $e_r$.

$$k = a^t e_r = \begin{bmatrix} 227 & 148 & 339 \end{bmatrix} \begin{bmatrix} 2209 \\ 4418 \\ 6627 \end{bmatrix} = 3401860$$

Step 5. The recipient 21 generates the same-shared secret key 52 k with recipient private key 51 c and the Encrypted Sender Private Key 50 $e_s$.

$$k = e_s c = \begin{bmatrix} 1540 & 3080 & 4620 \end{bmatrix} \begin{bmatrix} 389 \\ 268 \\ 428 \end{bmatrix} = 3401860$$

2. Encryption and Decryption

Step 6. Both sender and recipient convert 1×1 vector k into 3×3 matrix K by splitting the key into each cell of 3×3 matrix.

$$K = \begin{bmatrix} 0 & 0 & 3 \\ 4 & 0 & 1 \\ 8 & 6 & 0 \end{bmatrix}$$

Step 7. Sender transforms the message "Hello World!" into numbers with a two-digit number for each character according to preassigned numbers. In this example the letters are converted using an ASCII conversion where each letter is converted to a numerical value.

In this illustration, preassigned numbers for each character are H=44, e=15, l=22, o=25, blank=95, W=59, r=28, d=14, and !=63. Each number is serially appended together. This transforms the message into m=4415222225955925 28221463. Then m is split into each cell of 3×3 matrix M.

$$M = \begin{bmatrix} 44 & 222 & 528 \\ 15 & 595 & 221 \\ 22 & 592 & 463 \end{bmatrix}$$

Step 8. Sender generates 3×3 error matrix D with a secure random number generator or any other method that is unpredictable using the shared private key 52 k (3401860) as a seed.

$$D = \begin{bmatrix} 62421 & 13997 & 52136 \\ 53778 & 55426 & 49760 \\ 19811 & 72572 & 27115 \end{bmatrix}$$

Step 9. The sender generates the cipher text E with D and the shared private key K generated in step 6. Then transmits E to the recipient.

$$E = MK + D = \begin{bmatrix} 44 & 222 & 528 \\ 15 & 595 & 221 \\ 22 & 592 & 463 \end{bmatrix} \begin{bmatrix} 0 & 0 & 3 \\ 4 & 0 & 1 \\ 8 & 6 & 0 \end{bmatrix} + \begin{bmatrix} 62421 & 13997 & 52136 \\ 53778 & 55426 & 49760 \\ 19811 & 72572 & 27115 \end{bmatrix}$$

$$\text{Combining } E = \begin{bmatrix} 5112 & 3168 & 354 \\ 4148 & 1326 & 640 \\ 6072 & 2778 & 658 \end{bmatrix} + \begin{bmatrix} 62421 & 13997 & 52136 \\ 53778 & 55426 & 49760 \\ 19811 & 72572 & 27115 \end{bmatrix} =$$

$$\begin{bmatrix} 67533 & 17165 & 52490 \\ 57926 & 56752 & 50400 \\ 25883 & 75350 & 27773 \end{bmatrix}$$

Step 10. Recipient generates 3×3 error matrix D with a secure random number generator or any other method that is unpredictable, using the shared private key 52 k as a seed.

$$D = \begin{bmatrix} 62421 & 13997 & 52136 \\ 53778 & 55426 & 49760 \\ 19811 & 72572 & 27115 \end{bmatrix}$$

Then subtract D from E and recover the message M.

$$E - D = \begin{bmatrix} 67533 & 17165 & 52490 \\ 57926 & 56752 & 50400 \\ 25883 & 75350 & 27773 \end{bmatrix} - \begin{bmatrix} 62421 & 13997 & 52136 \\ 53778 & 55426 & 49760 \\ 19811 & 72572 & 27115 \end{bmatrix} =$$

$$\begin{bmatrix} 5112 & 3168 & 354 \\ 4148 & 1326 & 640 \\ 6072 & 2778 & 658 \end{bmatrix}$$

$$M = (E - D)K^t(KK^t)^{-1}$$

$$= \begin{bmatrix} 5112 & 3168 & 354 \\ 4148 & 1326 & 640 \\ 6072 & 2778 & 658 \end{bmatrix} \begin{bmatrix} 0 & 4 & 8 \\ 0 & 0 & 6 \\ 3 & 1 & 0 \end{bmatrix} \left( \begin{bmatrix} 0 & 0 & 3 \\ 4 & 0 & 1 \\ 8 & 6 & 0 \end{bmatrix} \begin{bmatrix} 0 & 4 & 8 \\ 0 & 0 & 6 \\ 3 & 1 & 0 \end{bmatrix} \right)^{-1}$$

$$= \begin{bmatrix} 44 & 222 & 528 \\ 15 & 595 & 221 \\ 22 & 592 & 463 \end{bmatrix}$$

Numbers in each cell of 3×3 matrix M are put together to form, m=4415222225955925 28221463. Then recipient converts m into characters by reversing two-digit numbers in m using the preassigned numbers and recovers the original message, "Hello World!"

Google defines "The rank of a matrix is defined as (a) the maximum number of linearly independent column vectors in the matrix or (b) the maximum number of linearly independent row vectors in the matrix. Both definitions are equivalent. For an r×c matrix, if r is less than c, then the maximum rank of the matrix is r." A matrix is said to have full rank if its rank is either equal to its number of columns or to its number of rows (or to both). A matrix that does not have full rank is said to be rank deficient.

Thus, specific embodiments of a quantum safe cryptography and advanced encryption and key exchange method for symmetric key encryption/exchange have been disclosed. The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A quantum safe cryptography and advanced encryption and key exchange (AEKE) method for symmetric key encryption/exchange comprising:

generating a sender private key 'a';

generating a recipient private key 'c';

generating a public key 'B' by the sender, said private keys 'a', 'c' and public key 'B' generated via an unpredictable random number generator, wherein public key 'B' is made a rank deficient linearly dependent matrix;

generating and distributing a shared key k by an equation k=$a^t$Bc for a product of a transpose of an n×1 vector '$a^t$' of the sender private key 'a', an n×n matrix 'B' of the public key, and an n×1 vector 'c' of a recipient private key 'c';

transmitting the public key 'B' to the recipient;
encrypting the sender private key by '$e_s' = a^r B$';
encrypting the recipient private key by '$e_r = Bc$';
exchanging the encrypted private keys '$e_s$' and '$e_r$' between the sender and the recipient;
generating a shared private key 'k' by '$a^r e_r$' by the sender;
generating the shared private key 'k' by '$e_s^r c$' by the recipient;
converting a 1×1 vector of the shared private key 'k' into a p×n matrix K by splitting the shared private key into each cell of a K matrix by the sender;
converting a 1×1 vector of shared private key 'k' into p×n matrix K by splitting the shared private key into each cell of the K matrix by the recipient;
a sending user encrypting a textual message by the sender converting the textual message into numbers and splitting the numbers to each cell of a message matrix 'M' using a character code;
the sender generates an m×n error matrix 'D' with an unpredictable random number generator using the shared private key 'k' as a seed;
the sender generates a cipher text 'E' with the error matrix 'D', the message matrix 'M' and the shared private key 'K' using an encryption equation E=MK+D;
the sender adds characters to the cipher text 'E';
the sender shuffles cell elements in the cipher text 'E';
the sender sends the cipher text 'E' to the recipient;
the recipient unshuffles the cipher text 'E';
the recipient subtracts added characters from the unshuffled cipher text 'E';
the recipient generates the m×n error matrix 'D' with the unpredictable random number generator using the shared private key 'k' as the seed;
the recipient decrypts, unshuffles and subtracts cipher text 'E' to recover the numbers in the message 'M' using the error matrix 'D' and the shared private key 'K' from the equation $M=(E-D)K^t(KK^t)^{-1}$, and
converts the recovered numbers in the message matrix 'M' into the textual message for a readable text message to the recipient.

2. The method according to claim 1, further includes shuffling the cipher text 'E' using the shared private key 'k' as the seed.

3. The method according to claim 1, further includes adding numbers or characters to make a uniform distribution of the cipher text 'E'.

4. The method according to claim 1, wherein the shared private key K is used a different key for each cell to increase an encryption security.

5. The method according to claim 1, wherein said character code is preassigned numbers for each character.

6. The method according to claim 1, wherein said symmetric key is a variable length.

7. The method according to claim 1, wherein a matrix is used the sender private key.

8. The method according to claim 1, wherein a matrix is used the recipient private key.

9. The method according to claim 1, further includes extending a length of the sender private key.

10. The method according to claim 1, further includes extending a length of the recipient private key.

11. The method according to claim 1, wherein said shared private key generation for the sender private key, the recipient private key and the public key is with real numbers.

12. The method according to claim 11, wherein said shared private key is a shared symmetric key.

13. The method according to claim 1, wherein said n×n matrix 'B' is at least a 2×2 matrix.

14. The method according to claim 1, further includes a rank deficient matrix of the public key 'B' for a key exchange.

15. The method according to claim 14, wherein said rank deficient matrix of the public key 'B' for said key exchange is by making a linearly dependent matrix.

* * * * *